July 18, 1967 J. BRIDGE 3,331,520
FREIGHT PALLET AND CARRIER
Filed May 3, 1965 9 Sheets-Sheet 1

FIG. 1

INVENTOR.
JOHN BRIDGE
BY
*Geam B. Moore*
ATTY.

July 18, 1967 J. BRIDGE 3,331,520
FREIGHT PALLET AND CARRIER
Filed May 3, 1965 9 Sheets-Sheet 3

INVENTOR.
JOHN BRIDGE
BY

July 18, 1967  J. BRIDGE  3,331,520
FREIGHT PALLET AND CARRIER
Filed May 3, 1965  9 Sheets-Sheet 9

INVENTOR.
JOHN BRIDGE
BY

United States Patent Office 3,331,520
Patented July 18, 1967

3,331,520
FREIGHT PALLET AND CARRIER
John Bridge, 343 S. Dearborn St.,
Chicago, Ill. 60604
Filed May 3, 1965, Ser. No. 452,564
3 Claims. (Cl. 214—515)

This invention relates to the construction of freight pallets and equipment for handling them. The usual procedure for handling packaged freight items involves collecting a convenient load or group of items on a movable platform known as a "pallet." The loaded pallet is then handled as a unit. The handling operations usually consist in a series of movements between loading docks and transporting vehicles, and in changes of placement in storage and work areas. Moving these loaded pallets is simplified by lifting them so that they may be shifted about on a wheeled vehicle. It is not desirable to apply permanent supporting wheels to the pallets, as it is necessary to hold them in predetermined positions between movements.

Lifting and local movement of the loaded pallet is commonly performed by lift trucks provided with elevatable cantilever beams ("forks") insertable under the pallets, but these units are quite costly. The present invention provides a much less expensive arrangement for transporting the loaded pallets on wheels, and then leaving them on solid support between movements so that friction will maintain the desired placement. A wheeled carrier is insertable under the pallet, and a lifting mechanism is included for transferring the weight of the loaded pallet from wheels to solid supports, and vice versa. In the preferred form of the invention, the lifting mechanism is mounted on the wheeled carrier; and a modified form of the invention provides for extendable leg structure on the pallet itself. The several features of the invention will be analyzed in detail through a discussion of the embodiments illustrated in the accompanying drawings. In the drawings:

Referring to the modification shown in FIGURES 1 through 14, the preferred form of the invention involves a pallet generally indicated at 20, and a wheeled carrier 21. The pallet includes a platform structure 22 surrounded by a group of stakes 23 for confining items of freight placed upon the platform 22. Fixed legs as shown at 24 and 25 are mounted at opposite ends of the pallet 20 for supporting it during periods in which the carrier 21 is removed. The carrier is provided with a towing handle 26 pivotally mounted on the pin 27 engaging the brackets 28 secured to the frame 29 of the carrier, and a following rod 30 is slidably mounted in the collar 31 secured to the bracket 28 for engagement and disengagement from conventional guiderail structure provided in floor areas to establish a path of movement of the carriers when they are being towed by vehicles or conveyor mechanism. A radial stop 32 is mounted on the rod 30 to limit the downward movement within the collar 31. The rod may be elevated out of a position where it might engage a guiderail, and the stop 32 can then be swung around the axis of the rod to engage either the top of the bracket 28, or the platform 22 to maintain the elevated position of the rod so that it will not drag along the floor.

Figure 1:
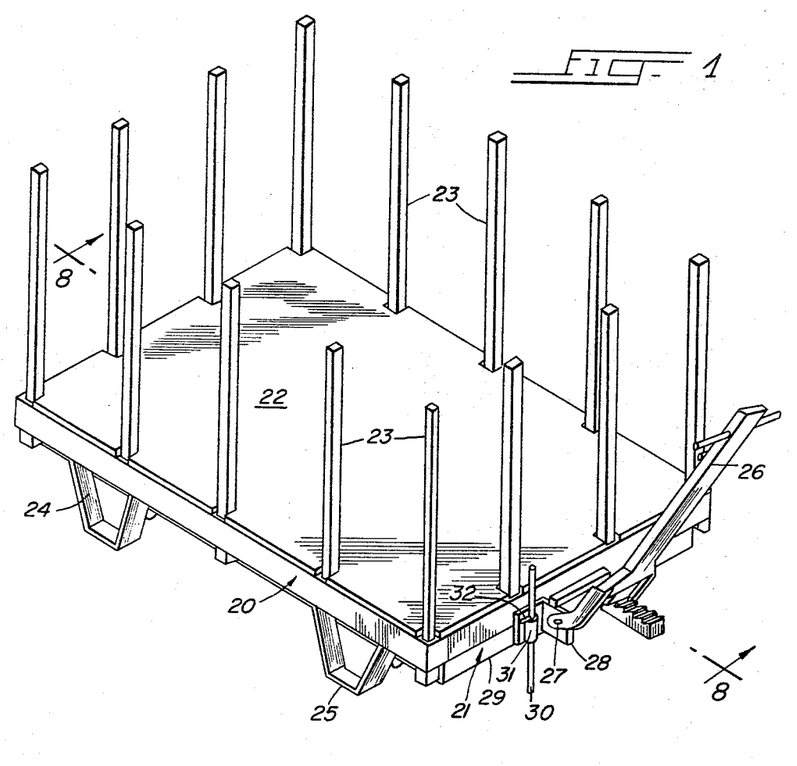
FIGURE 1 is at perspective view of a pallet positioned on a carrier, with these components being constructed according to the preferred form of the invention.
Figure 2:
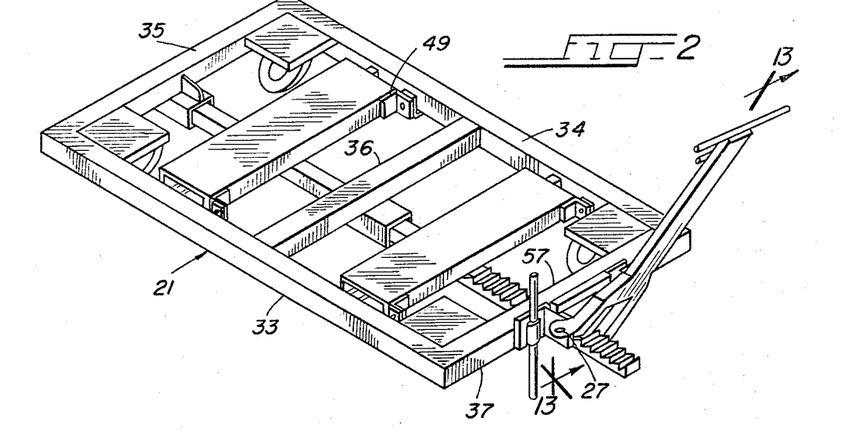
FIGURE 2 is a perspective view showing the carrier with the pallet removed.
Figure 3:
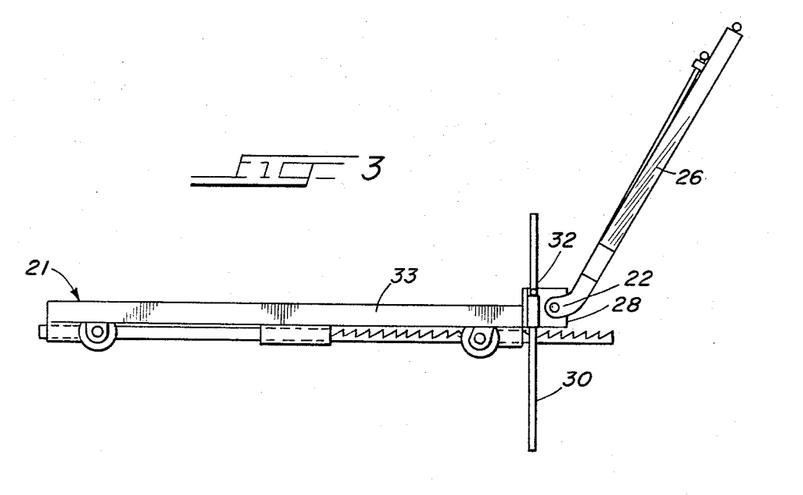
FIGURE 3 is a side elevation of the carrier shown in FIGURE 2, with the lifting mechanism in the retracted position.
Figure 4:
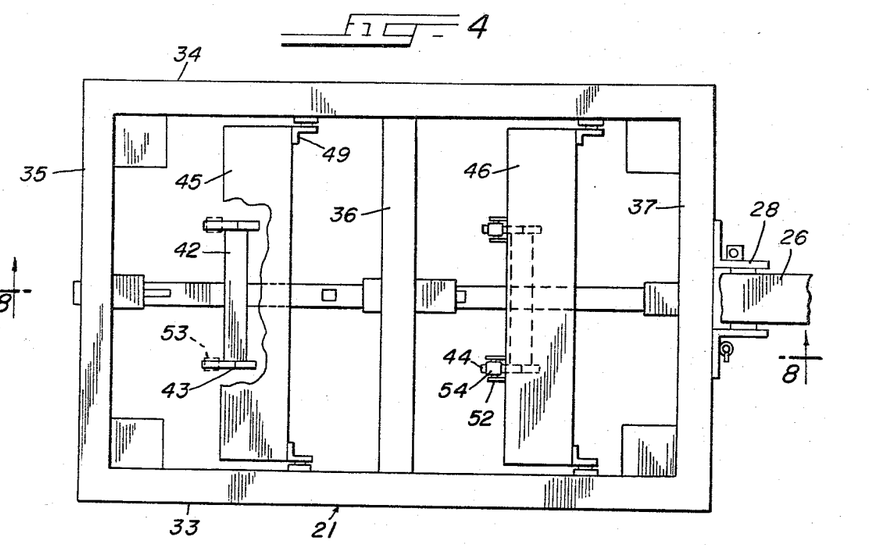
FIGURE 4 is a plan view of the carrier shown in FIGURE 3.
Figure 5:
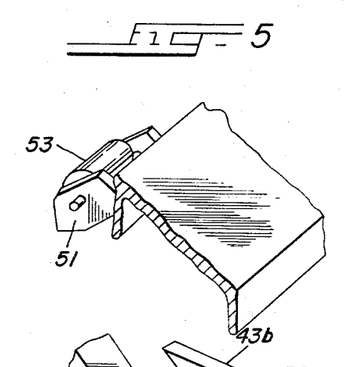
FIGURE 5 is a fragmentary view on an enlarged scale showing the portion of one of the elevatable bearing members provided with a roller assembly.
Figure 6:
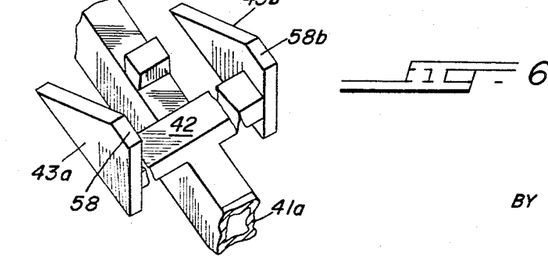
FIGURE 6 is a fragmentary view in perspective showing one of the cam assemblies mounted on the sliding bar of the lifting mechanism.
Figure 7:
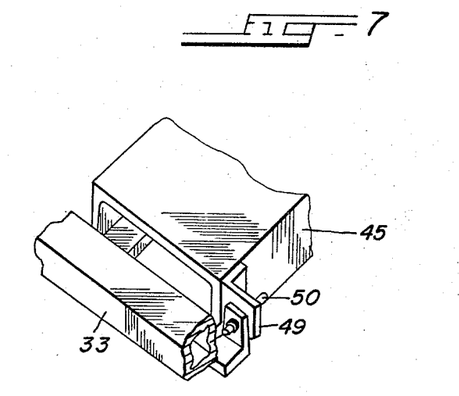
FIGURE 7 is a fragmentary view showing the pivotal mounting of one of the elevatable bearing members.
Figure 8:
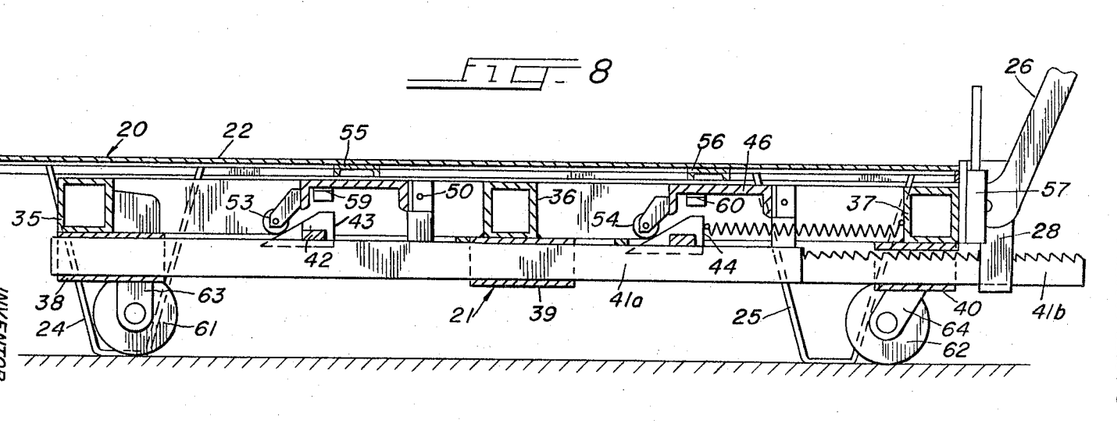
FIGURE 8 is a section on the plane 8—8 of FIGURE 4, on an enlarged scale.
Figure 9:
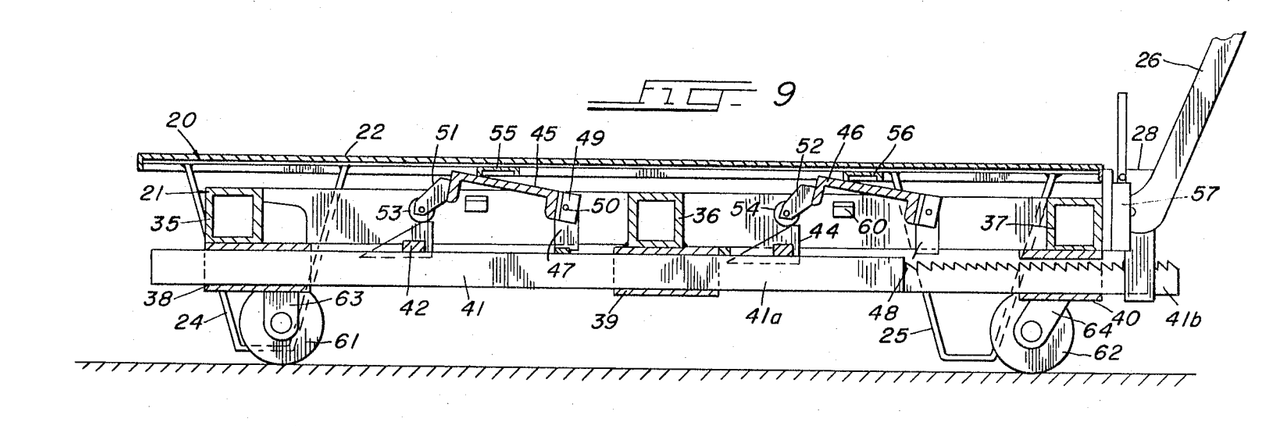
FIGURE 9 is a view similar to FIGURE 8, but showing the lifting mechanism in the elevated position.
Figure 10:
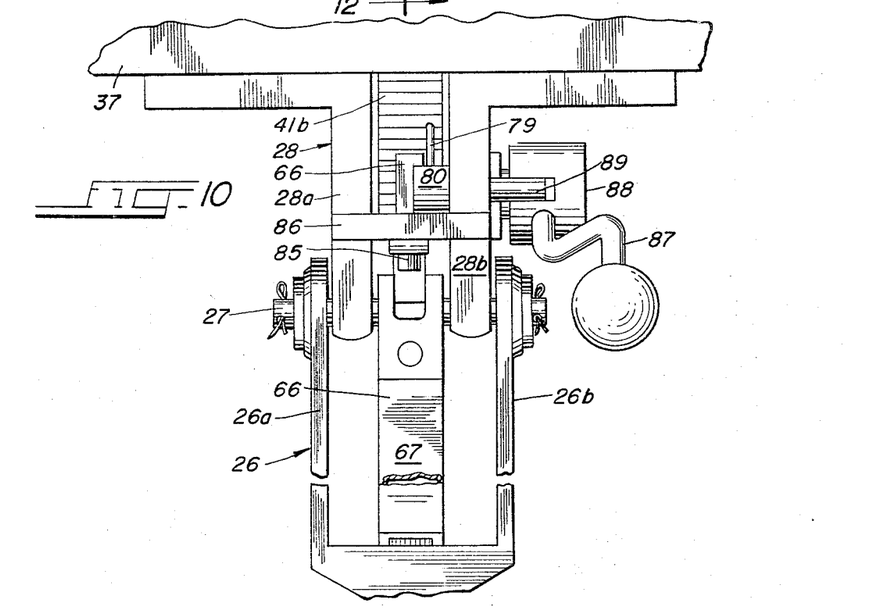
FIGURE 10 is a plan view of the structure adjacent the pivotal mounting of the towing handle.
Figure 11:
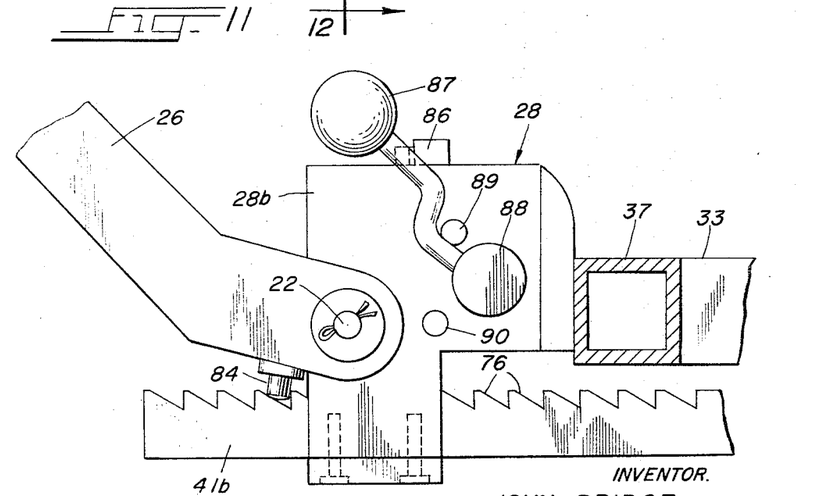
FIGURE 11 is a side elevation of the mechanism shown in FIGURE 10.

Referring to FIGURES 2 and 3, the carrier 21 includes a frame defined by the longitudinal members 33 and 34 interconnected by the transverse members 35-37. The sleeves 38-40 (refer to FIGURES 8 and 9) are mounted respectively on the transverse members 35-37 for slidably supporting the bar 41. Preferably, this bar includes a tubular portion 41a and a rack 41b. A pair of cross beams shown at 42a and 42b are secured to the tubular portion 41a, and extend transversely to provide supports for the cams 43 and 44.

The movable bearing members 45 and 46 are in the form of transverse channel-shaped beams pivotally mounted on the brackets 47 and 48, respectively, which are secured to the longitudinals 33 and 34 of the carrier frame. It is preferred that the bearing members 45 and 46 be provided with angular pieces as shown at 49 so that the pivotal mounting can be provided by pins 50 which can engage one leg of the angles 49 and also the brackets 47. The opposite edge of the movable bearing members 45 and 46 is provided with cantilever arms 51 and 52 for supporting the rollers 53 and 54 positioned for engagement with the cams 43 and 44. The result of this construction is that movement of the bar 41 to the left from the position shown in FIGURE 8 to that of FIGURE 9 will result in forcing the cams 43 and 44 under the rollers 53 and 54, and thus rotating the movable bearing members 45 and 46 upwardly to engage the reinforcing channels 55 and 56 of the platform structure 22. This condition will result in supporting the pallet on the wheeled carrier, and it will be noted that the elevated position of the members 45 and 46 (shown in FIGURE 9) presents an inclined surface for the support of the pallet, with the direction of the incline tending to induce movement of the pallet to the right with respect to the carrier. During the rotation of the members 45 and 46 to the FIGURE 9 position, it will also be noted that a component of movement will be produced in this same direction. This movement is limited by the presence of the stop 57 secured to the transverse member 37 of the carrier frame. The interaction of the forces involved tends to produce a fixed position of the pallets with respect to the carrier.

It is preferable that the cams 43 and 44 be provided with flat surfaces at the upper extremities as shown at 58a–b (refer to FIGURE 6) to establish a rest position of the bar 41, with the load of the pallet being supported by the carrier under conditions in which there is no tendency for the bar 41 to move to the right. It is also preferable to include stops as shown at 59 and 60 to establish a rest position of the members 45 and 46 in the retracted position shown in FIGURE 8. Front and rear wheels as shown at 61 and 62 are mounted on conventional brackets 63 and 64 secured to the frame of the carrier.

Figures 12, 13, 14, 26:
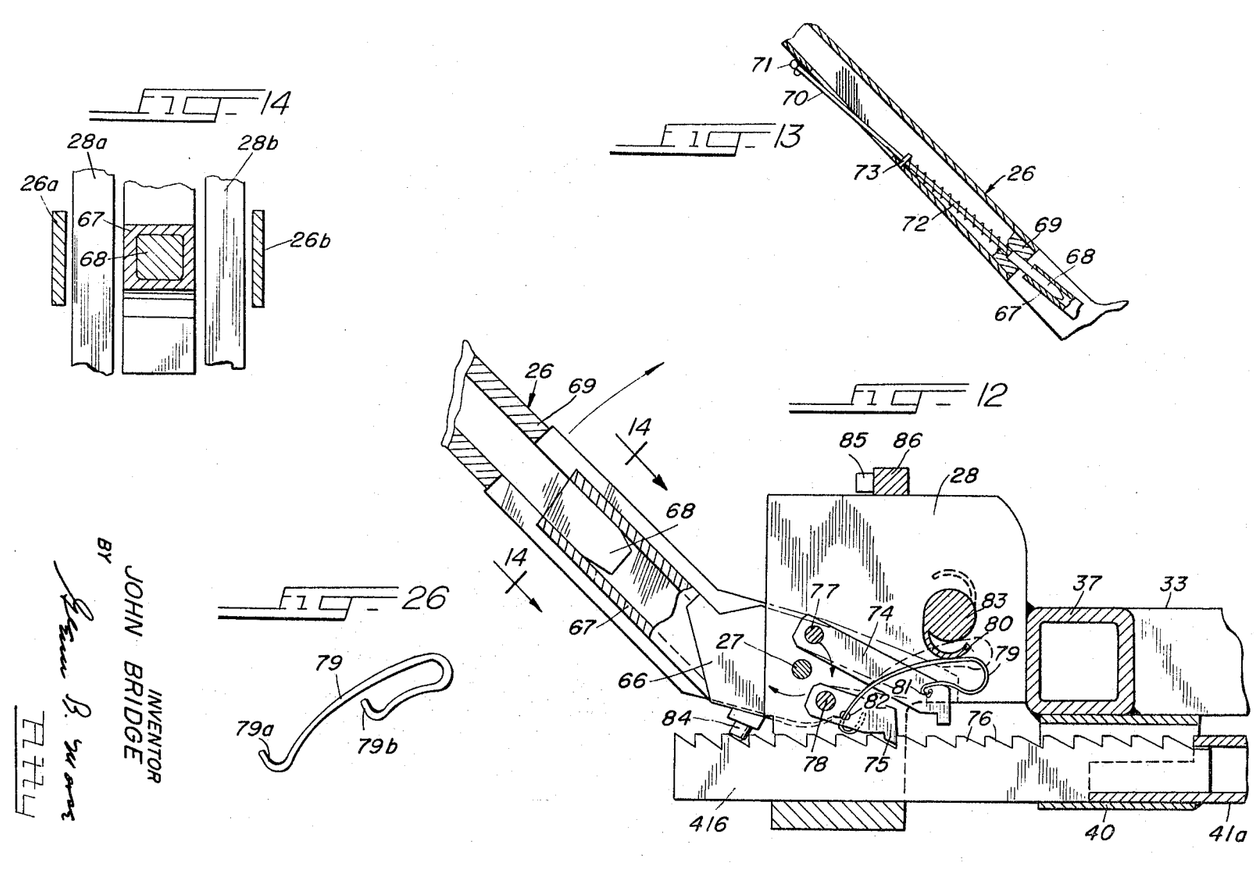
FIGURE 12 is a view on the plane 12—12 of FIGURE 10.
FIGURE 13 is a fragmentary view showing the disengageable connection between the towing handle and the lifting mechanism.
FIGURE 14 is a section on the plane 14—14 of FIGURE 12.
FIGURE 26 is a perspective view of the bent wire spring shown in the mechanism illustrated in FIGURE 12.
Figure 15:
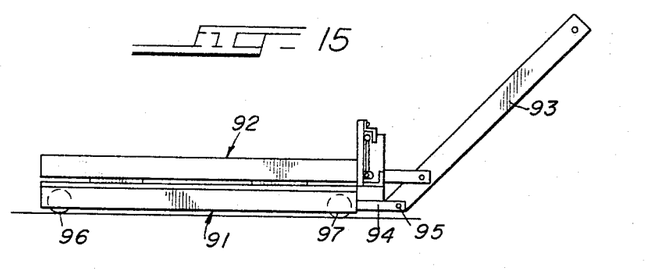
FIGURE 15 is a side elevation of a modified form of the invention, in the condition in which the pallet is supported on the wheeled carrier.

The arrangement for moving the bar 41 to lift the pallet is similar in general principle to the action of an automobile jack, and is illustrated in FIGURE 12. The portions 26a and 26b of the handle 26 form a fork receiving the portions 28a and 28b of the mounting bracket 28. The pivot pin 27 traverses these elements, and also the actuator 66 (refer to FIGURES 12 and 13). This actuator has a tubular extension 67 engageable by the plunger 68 slidably mounted in the block 69 of the towing handle 26. This plunger is positioned by the rod 70 provided with the handle 71. A compression spring 72 acting against the guide 73 urges the plunger 68 into engagement with the tubular extension 67. The function of this engagement is to cause the actuator 66 to rotate with the towing handle 26, and disengagement of the projection 68 permits the towing handle to be manipulated without operating the lifting mechanism.

With the plunger 68 engaged as shown in FIGURE 12, reciprocating rotary movement of the towing handle 26 will bring the pawls 74 and 75 into engagement with the teeth 76 of the rack 41b. The pawls are pivotally mounted on the actuator on the pins 77 and 78, respectively, and are positioned with respect to the rack 41b by the combined action of the wire spring 79 and the control cam 80. The spring 79 has its ends 79a and 79b (refer to FIGURE 26) bent laterally to engage the holes 81 and 82 in the pawls 74 and 75, respectively, and the effect of the spring 79 is to produce a tendency for the pawls 74 and 75 to separate from each other. Rotation of the cam 80 about the shaft 83 to the full line position shown in FIGURE 12 will bring the cam 80 to bear on the top of the spring 79, and thus urge the pawl 74 into engagement with the teeth 76. In the dotted line position shown in FIGURE 12, a biasing action still exists against the pawl 75, but the engagement of the pawl 74 with the teeth 76 requires a further rotation of the towing handle 26 in a clockwise direction. The effect of the position of the cam 80 is therefore to control the sequence of engagement of the pawls 74 and 75, and in this manner it is possible to control the direction of movement of the rack 41b. This mechanism is similar in principle to that of the ordinary automobile jack, and the specific details of this mechanism are not a part of the present invention. It is preferable to incorporate a stop 84 in the actuator 66 to limit the counterclockwise rotation of the towing handle 26, and also the stop 85 mounted on the bridging member 86 extending between the bracket portions 28a and 28b to limit the rotation of the towing handle 26 in the clockwise direction. The position of the cam 80 and the shaft 83 is controlled by the handle 87 having the hub 88 secured to the shaft 83. The limit stops 89 and 90 mounted on the bracket portion 28b establish the range of movement of the handle 87.

Figure 16:
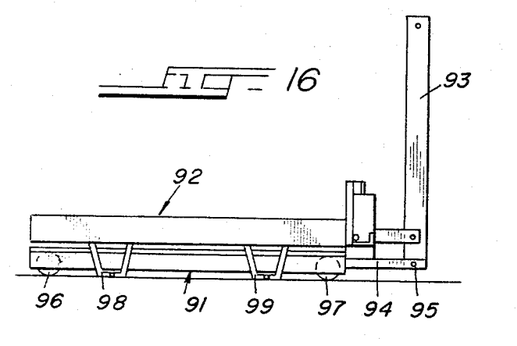
FIGURE 16 is a view of the device shown in FIGURE 15, with the extendable legs of the pallet lowered to support the weight of the loaded pallet.
Figure 17:
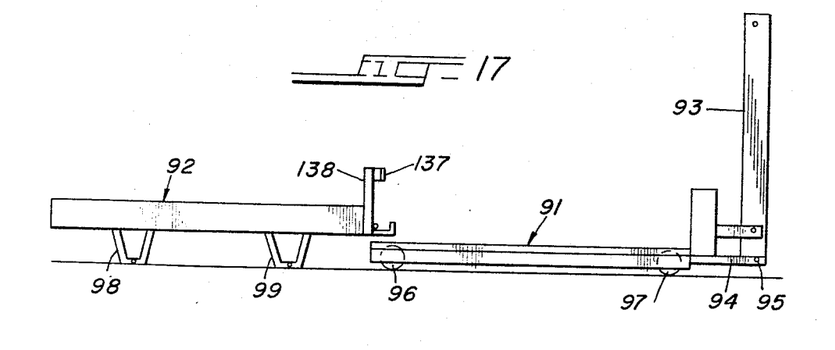
FIGURE 17 is a view showing the carrier withdrawn from the pallet.
Figure 18:
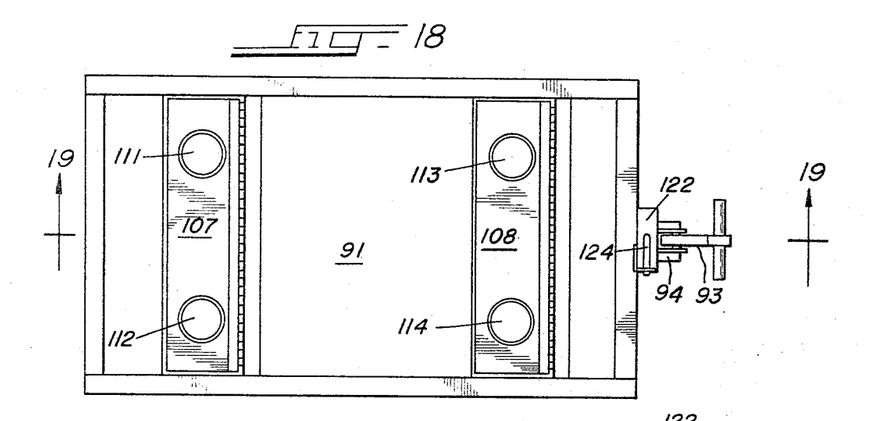
FIGURE 18 is a plan view of the carrier shown in FIGURES 15-17.
Figure 19:
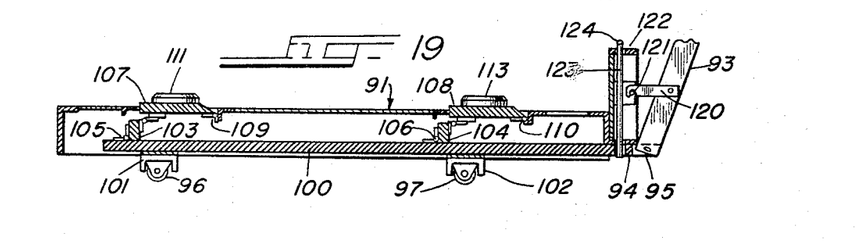
FIGURE 19 is a view on the plane 19—19 of FIGURE 18.
Figure 20:
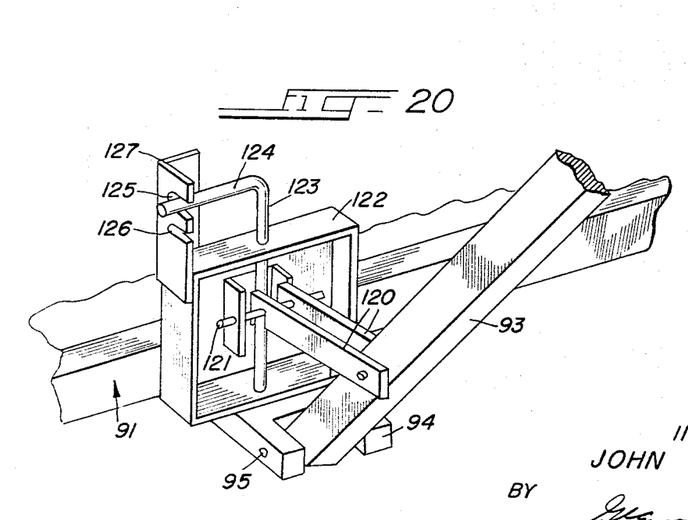
FIGURE 20 is a perspective view showing the structure adjacent to the pivotal mounting of the towing handle of the modifications shown in FIGURES 18 and 19.
Figure 21:
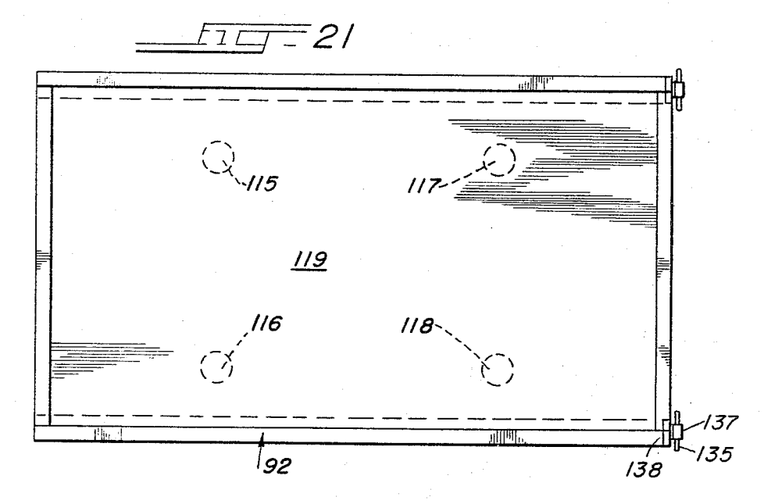
FIGURE 21 is a plan view of the pallet shown in FIGURES 15-17.

Referring to FIGURES 15 through 24, a modification of the invention is illustrated which involves the wheeled carrier generally indicated at 91 and the pallet 92. The carrier has a towing handle 93 pivotally mounted on the bracket 94 at the pin 95. Front and rear wheels as shown at 96 and 97 support the carrier and the pallet 92 when the legs are retracted in the position shown in FIGURE 15. The leg structure 98 and 99 may be extended as shown in FIGURE 16; and under these conditions, the carrier 91 may be withdrawn to the right. The pivot bracket 94 is a part of a slide member 100 which is mounted for reciprocating sliding movement with respect to the carrier 91 on the transverse members 101 and 102. The link blocks 103 and 104 are hinged to the slide member 100 as shown at 105 and 106, respectively in FIGURE 19. These link blocks are also hinged to the plates 107 and 108, the opposite edges of which are hinged to the frame of the carrier as shown at 109 and 110. The plate 107 is provided with the dome-shaped projections 111 and 112, and the plate 108 with the projections 113 and 114. These projections are engageable with similarly-located recesses 115–118 in the underside of the panel structure 119 of the pallet 92. This interengagement serves as a means of positive location of the pallet with respect to the carrier.

The front-rear movement of the slide member 100 for inducing engagement and disengagement is provided by rotation of the towing handle 93 while the links 120 are engaged with the pin 121 mounted in the structure 122 of the frame of the carrier. The vertically-slidable locking pin 123 is also mounted in the structure 122, and is engageable with an opening in the bracket portion 94 of the slide member 100 shown in FIGURE 19. The offset upper extremity 124 of the rod 123 is engageable with the notches 125 or 126 of the extension 127 to maintain the position of the rod 123 either engaged or disengaged from the slide member 100.

Figure 22:
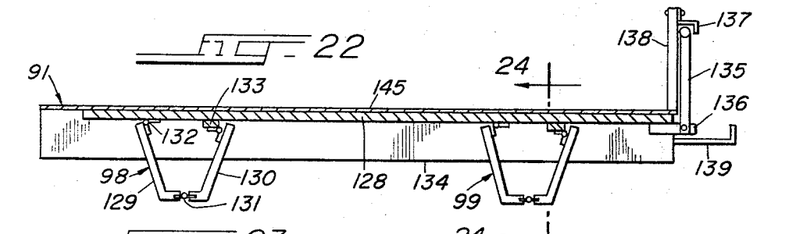
FIGURE 22 is a sectional elevation of the pallet shown in FIGURE 21, with the leg members in the extended position.
Figures 23, 24, 25:
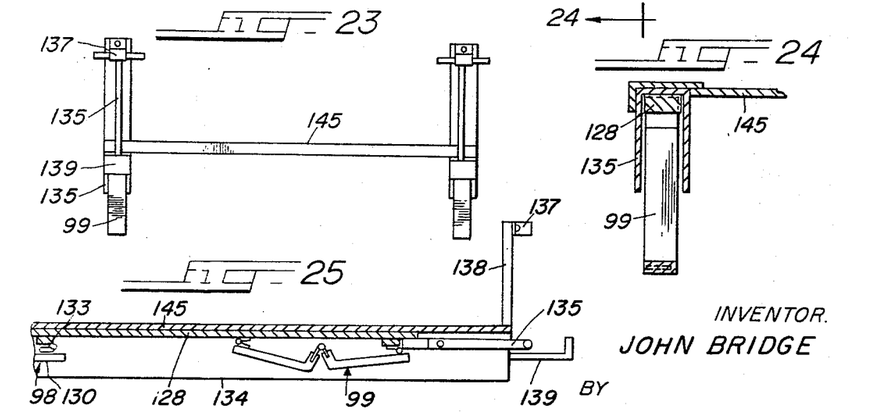
FIGURE 23 is an end elevation of the pallet shown in FIGURE 22.
FIGURE 24 is a section on the plane 24—24 of FIGURE 22.
FIGURE 25 is a view similar to FIGURE 22, with the leg members retracted.

The extendable leg systems 98 and 99 of the pallet 92 are best shown in FIGURES 22, 23, and 24. This mechanism is duplicated along the opposite edges of the pallet 92, and is based on the action of the slide bars 128. The front and rear leg units 98 and 99 are similarly constructed, and include the toggle elements 129 and 130 hinged together at 131. The toggle element 129 is hinged to the slide member 128 at 132, and the upper extremity of the toggle member 130 is hinged to the fixed abutment 133 mounted on the frame 134 of the pallet. Movement to the right of the slide member 128, as shown in FIGURE 22, will bring the upper extremities of the toggle members 129 and 130 together, and thus bring the point of hinge connection at 131 downward into the extended position. Movement of the slide member 128 to the left will induce the opposite movement, and retract the toggle members upwardly toward the slide member 128.

Movement of the slide member 128 is induced by the handle link 135 mounted on the bracket 136 pivotally secured to the slide member 128. A locking retainer is preferably incorporated as shown at 137 for securing the handle 135 in the FIGURE 22 position. The retainer 137 is rotatable about a horizontal axis to release the handle 135. When the handle is positioned by the retainer, as shown in FIGURE 22, the slide member 128 is prevented from movement to the left. It is preferable that the retainer 137 be mounted on posts as shown at 138 secured to the frame 134 of the pallet. It is also preferable to incorporate the arms 139 in the structure to support the handles 135 when the slide member is moved to the left.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a pallet having a platform and spaced leg members for supporting said platform on a floor surface, a pallet carrier comprising:

a frame movable under said platform and between said members, said frame having a guideway and an abutment;

a towing handle pivotally connected to said frame for limited rotation on a normally horizontal axis; and load-transfer mechanism operative to induce relative vertical movement between said pallet and said carrier to shift the support of said pallet from said leg members to said carrier, said load-transfer mechanism including a bar slidably received in said guideway, said bar having at least one cam, said load-transfer mechanism also including a bearing member pivotally connected to said frame and engageable with the underside of said platform, said bearing member being engageable by said cam whereby movement of said bar induces vertical movement of at least a portion of said bearing member to lift said pallet, said bearing member having a tendency to urge said pallet toward said abutment on elevating said pallet.

2. In combination with a pallet having a platform and spaced leg members for supporting said platform on a floor surface, a pallet carrier comprising:

a frame receivable under said platform and between said members, said frame having a guideway;

a towing handle pivotally connected to said frame for limited rotation on a normally horizontal axis; and load-transfer mechanism operative to induce relative vertical movement between said pallet and said carrier to shift the support of said pallet from said leg members to said carrier, said load-transfer mechanism including a bar slidably received in said guideway, said bar having a rack and at least one cam, said load-transfer mechanism also including a bearing member engageable with the underside of said platform and movably mounted on said frame, said bearing member being engageable by said cam whereby movement of said bar induces vertical movement of at least a portion of said bearing member to lift said pallet, said lifting mechanism also including a ratchet system operable on said rack portion and operably connected to said handle.

3. A combination as defined in claim 2, wherein said handle includes means for operably disengaging said handle from said lifting mechanism.

References Cited

UNITED STATES PATENTS

| 1,121,052 | 12/1914 | Taylor | 254—5 |
| 1,160,666 | 11/1915 | Stuebing | 254—5 |
| 1,286,861 | 12/1918 | Willer | 254—5 |
| 1,414,163 | 4/1922 | Anthony | 254—5 |
| 1,522,519 | 1/1925 | Hennessy | 254—5 |

FOREIGN PATENTS 1,089,143  9/1960  Germany.

GERALD M. FORLENZA, *Primary Examiner.*

A. J. MAKAY, *Assistant Examiner.*